US009153281B2

(12) United States Patent  (10) Patent No.: US 9,153,281 B2
Hill et al.  (45) Date of Patent: Oct. 6, 2015

(54) MAGAZINE DROP-OUT FOR A ROBOTIC GRIPPER

(75) Inventors: Dean Austin Hill, Greeley, CO (US); Matthew David Woodbury, Westminster, CO (US); Christopher John Clos, Westminster, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 637 days.

(21) Appl. No.: 13/466,991

(22) Filed: May 8, 2012

(65) Prior Publication Data

US 2013/0302116 A1  Nov. 14, 2013

(51) Int. Cl.
*G06F 7/00* (2006.01)
*G11B 15/68* (2006.01)

(52) U.S. Cl.
CPC .................................. *G11B 15/6835* (2013.01)

(58) Field of Classification Search
None
See application file for complete search history.

(56) References Cited

U.S. PATENT DOCUMENTS

2011/0131782 A1\*  6/2011  Suzuki et al. ................ 29/426.1

\* cited by examiner

*Primary Examiner* — Yolanda Cumbess
(74) *Attorney, Agent, or Firm* — Marsh Fischmann & Breyfogle LLP; Daniel J. Sherwinter

(57) ABSTRACT

Embodiments of the invention include systems and methods for providing gripper recovery using a magazine drop-out feature. Embodiments operate in context of a data storage library having a number of media cartridges physically located within slots of one or more magazines. A robotic hand assembly uses a gripper mechanism to retrieve and ferry the cartridges between the magazines and one or more media drives. In some instances, the gripper mechanism is unable to disengage from the cartridge or to disengage the cartridge from its magazine slot. Embodiments detect this condition and direct the robotic hand assembly to drop out of engagement with the cartridge through the drop-out region of the magazine slot, allowing the gripper mechanism to recover.

20 Claims, 10 Drawing Sheets

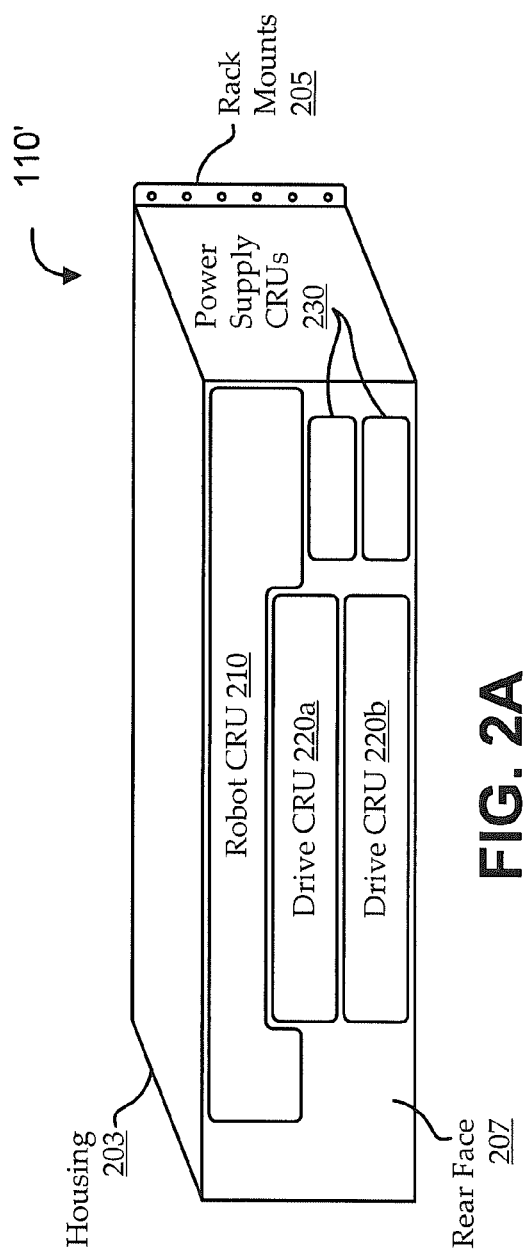
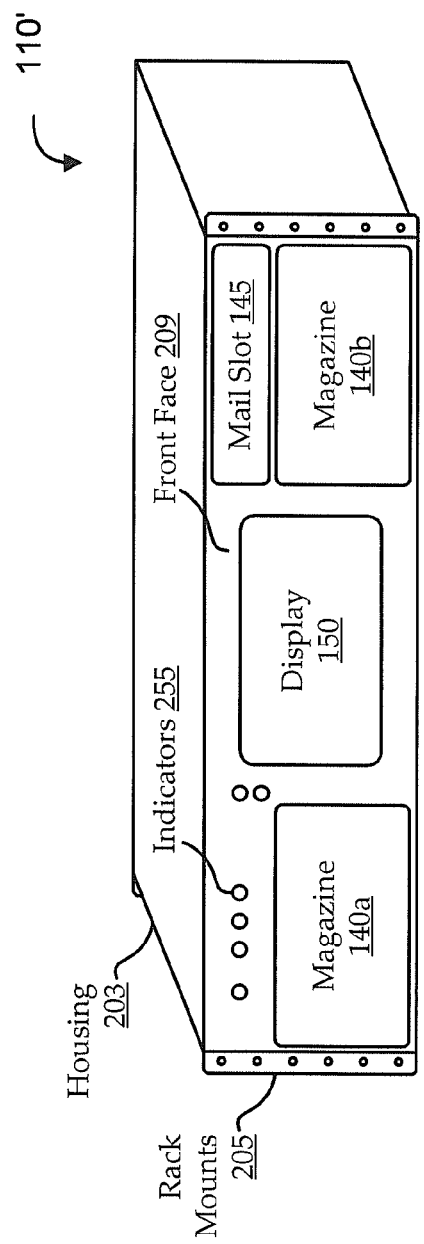
FIG. 2A
FIG. 2B

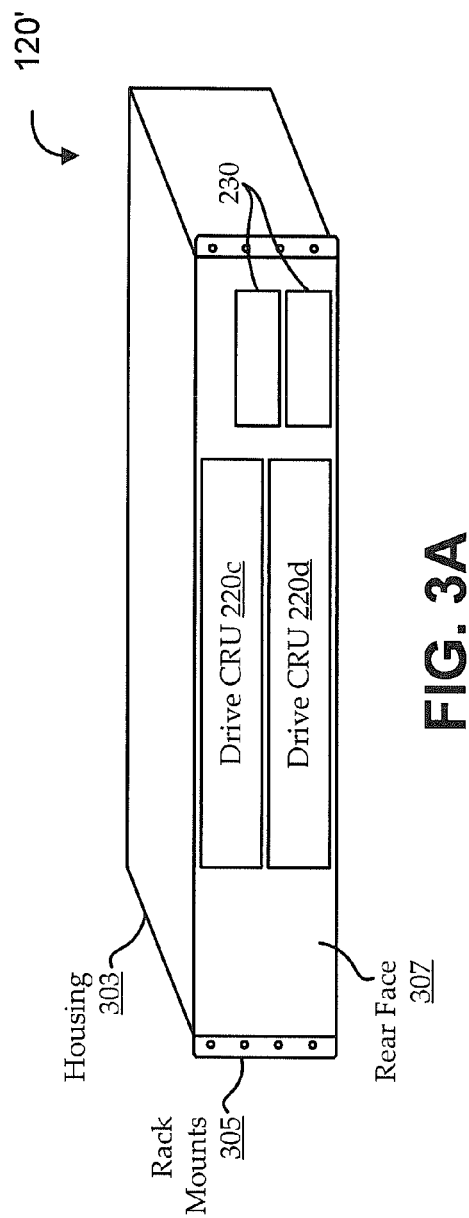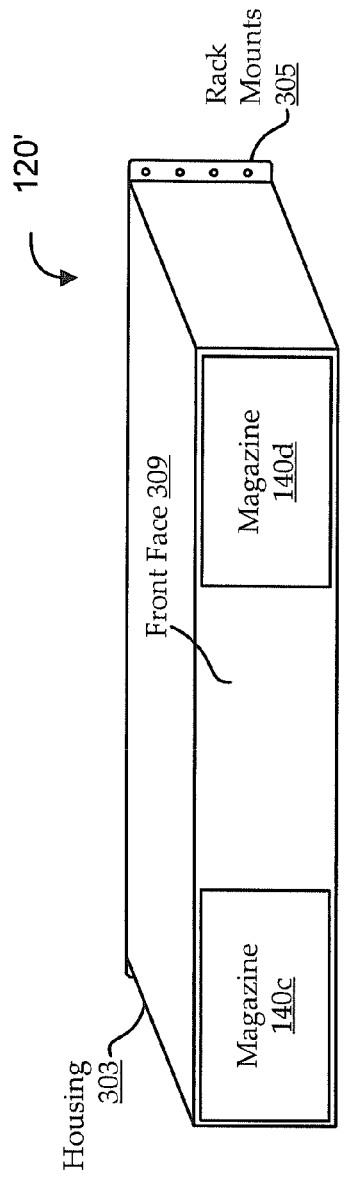
FIG. 3A
FIG. 3B

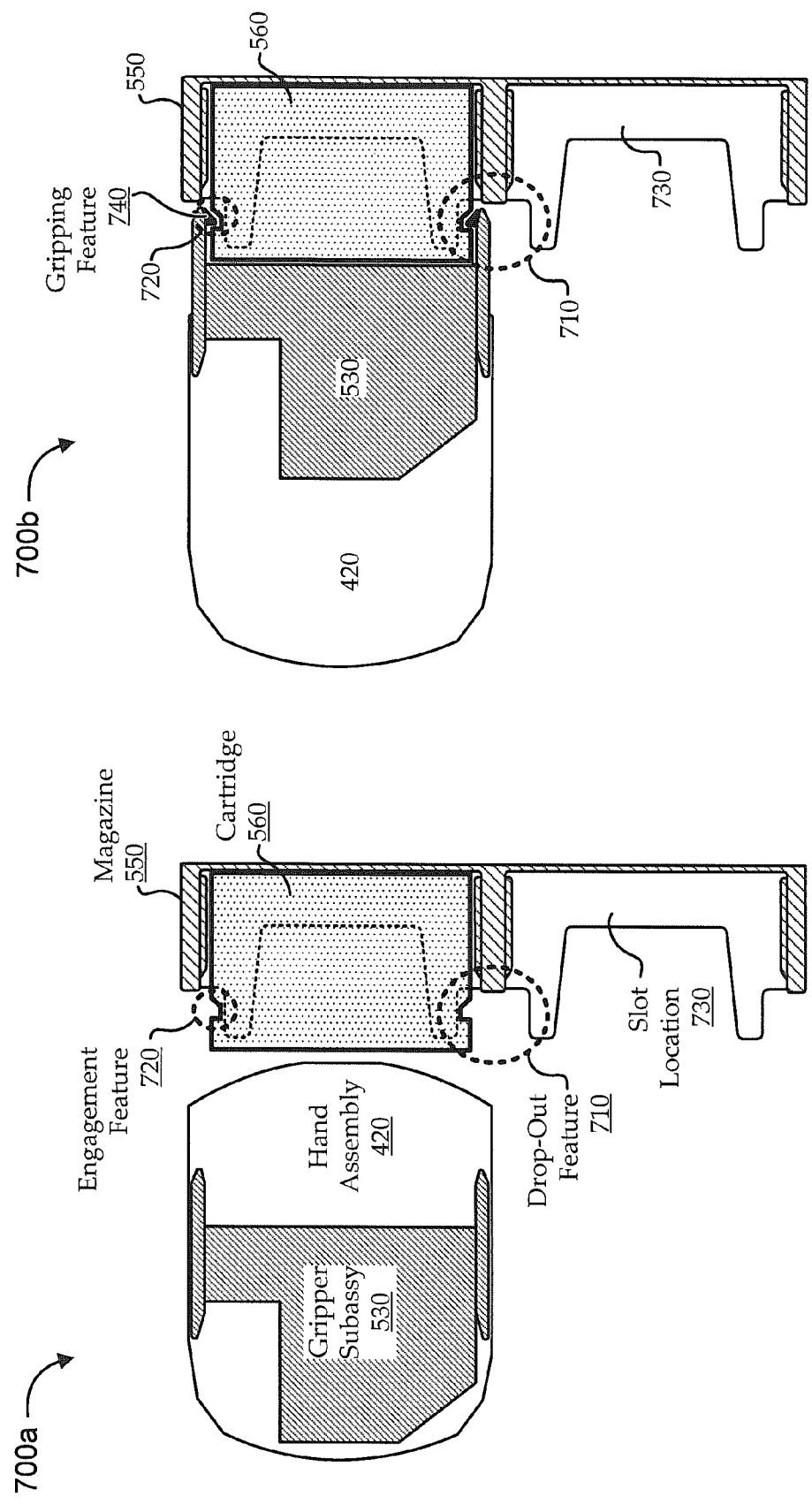

MAGAZINE DROP-OUT FOR A ROBOTIC GRIPPER

FIELD

Embodiments relate generally to data storage systems, and, more particularly, to cartridge magazines for use in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, the robotic mechanisms are expected to reliably (e.g., repeatably and accurately) and rapidly find, retrieve, and deliver desired cartridges throughout the storage library cartridge inventory. This functionality can be facilitated by configuring the robotic mechanism to move a hand assembly in at least three axes (e.g., x, y, and z directions, and sometimes one or more of pitch, roll, or yaw), and to include one or more sensors to reliably detect the position and/or orientation of the hand assembly. When in its desired location, the hand assembly is activated to reliably grip the desired cartridge and remove it from a magazine or drive, or to reliably release the cartridge into a desired magazine slot or drive. The gripping and/or releasing of the cartridge is typically performed by a gripper that is part of the hand assembly.

Many traditional implementations of the gripper include complex, expensive, and/or heavy components. For example, some designs use solenoid-operated opposing gripper plates acting against a spring load. While these and other techniques can be reliable, they tend to manifest undesirable power consumption characteristics and to include heavy and/or expensive components (e.g., solenoids, power cables, specialized hardware and software, etc.).

BRIEF SUMMARY

Among other things, systems and methods are described for providing gripper recovery using a magazine drop-out feature. Embodiments operate in context of a data storage library having a number of media cartridges physically located within slots of one or more magazines. A robot with a hand assembly uses a gripper mechanism to retrieve and ferry the cartridges between the magazines and one or more media drives. Some types of gripper mechanisms are designed with ratcheting functionality or the like so that extending and retracting the gripper mechanism causes it to toggle between engaged and disengaged states. While this type of design may provide various features (e.g., reduced weight, cost, and/or complexity of the gripper mechanism design), the design may also manifest particular failure modes not present in more complex implementations.

For example, if a cartridge is stuck in a magazine slot with the gripper engaged, it may be impossible to toggle the gripper mechanism to a disengaged state without retracting the gripper, and it may be impossible to retract the gripper mechanism without disengaging from the cartridge. Traditionally, this may result in a disengagement error that is unrecoverable without damage to the cartridge or gripper mechanism or without manual intervention. Embodiments provide novel drop-out features of the magazines. When a disengagement error of this type is detected, the gripper can move orthogonal to its extend-retract direction via the drop-out features. Once clear of the stuck cartridge, the gripper mechanism can continue to operate properly. For example, the gripper mechanism can cycle back to a disengaged, retracted state. Embodiments further include logging the disengagement error.

According to one set of embodiments, a storage system is provided. The system includes: a magazine having a number of slots, each configured to receive cartridges and each having a drop-out region; a cartridge installed in a respective slot of the magazine; and a robotic hand assembly having a gripper mechanism configured to engage with the installed cartridge. The robotic hand assembly is configured to: direct the gripper mechanism to perform a cartridge disengagement function with respect to the installed cartridge while the gripper mechanism is engaged with the installed cartridge; detect a disengagement error preventing performance of the cartridge disengagement function; and drop at least the gripper mechanism out of engagement with the installed cartridge through the drop-out region of the respective slot of the magazine in response to detecting the disengagement error. In some such embodiments, the robotic hand assembly is configured to direct the gripper mechanism to perform the cartridge disengagement function by retracting the gripper mechanism while maintaining engagement between the gripper mechanism and the installed cartridge to remove the cartridge from its respective slot. In other such embodiments, the robotic hand assembly is configured to direct the gripper mechanism to perform the cartridge disengagement function by directing the gripper mechanism to disengage from the installed cartridge while maintaining the installed cartridge in its respective slot.

According to another set of embodiments, a method is provided. The method includes: directing a gripper mechanism of a robotic hand assembly to perform a cartridge disengagement function with respect to a cartridge while the gripper mechanism is engaged with the cartridge and the cartridge is installed in a respective one of a number of slots of a magazine, each slot having a drop-out region; detecting a disengagement error preventing performance of the cartridge disengagement function; and directing the robotic hand assembly to drop out of engagement with the cartridge through the drop-out region of the respective slot of the magazine in response to detecting the disengagement error. Some such embodiments further include cycling the gripper mechanism to a next engagement state after the robotic hand assembly has dropped out of engagement with the cartridge through the drop-out region of the respective slot of the magazine and the gripper mechanism is clear of the cartridge. Other such embodiments further include logging and/or reporting the disengagement error.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIGS. 3A and 3B show rear and front views, respectively, of an illustrative expansion module, according to various embodiments;

FIGS. 7A and 7B show top views of a partial environment in which a gripper subassembly of a hand assembly engages with an engagement feature of the cartridge, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
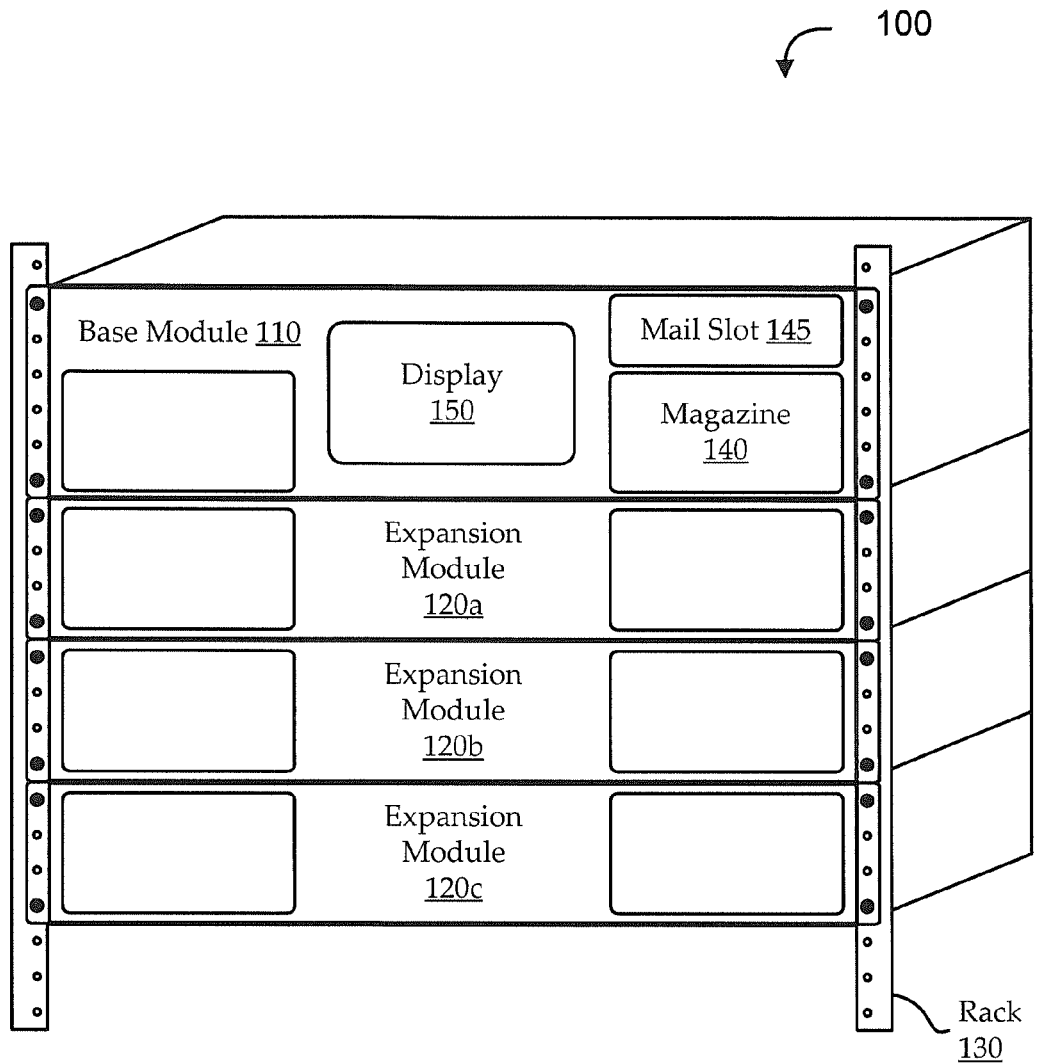
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
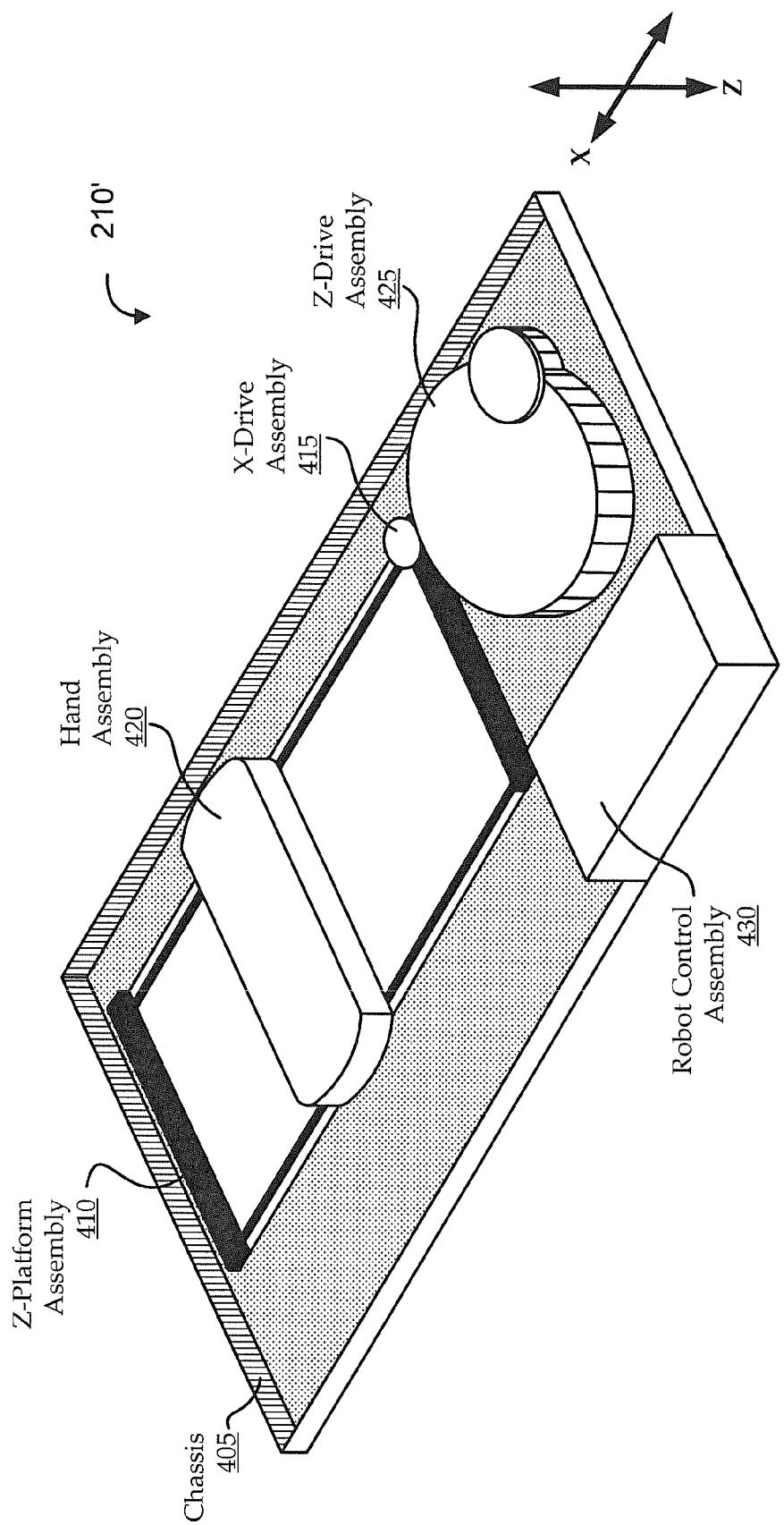
FIG. 4A shows a view looking down on the underside of an illustrative robot CRU (customer replaceable unit), according to various embodiments.
Figure 4B:
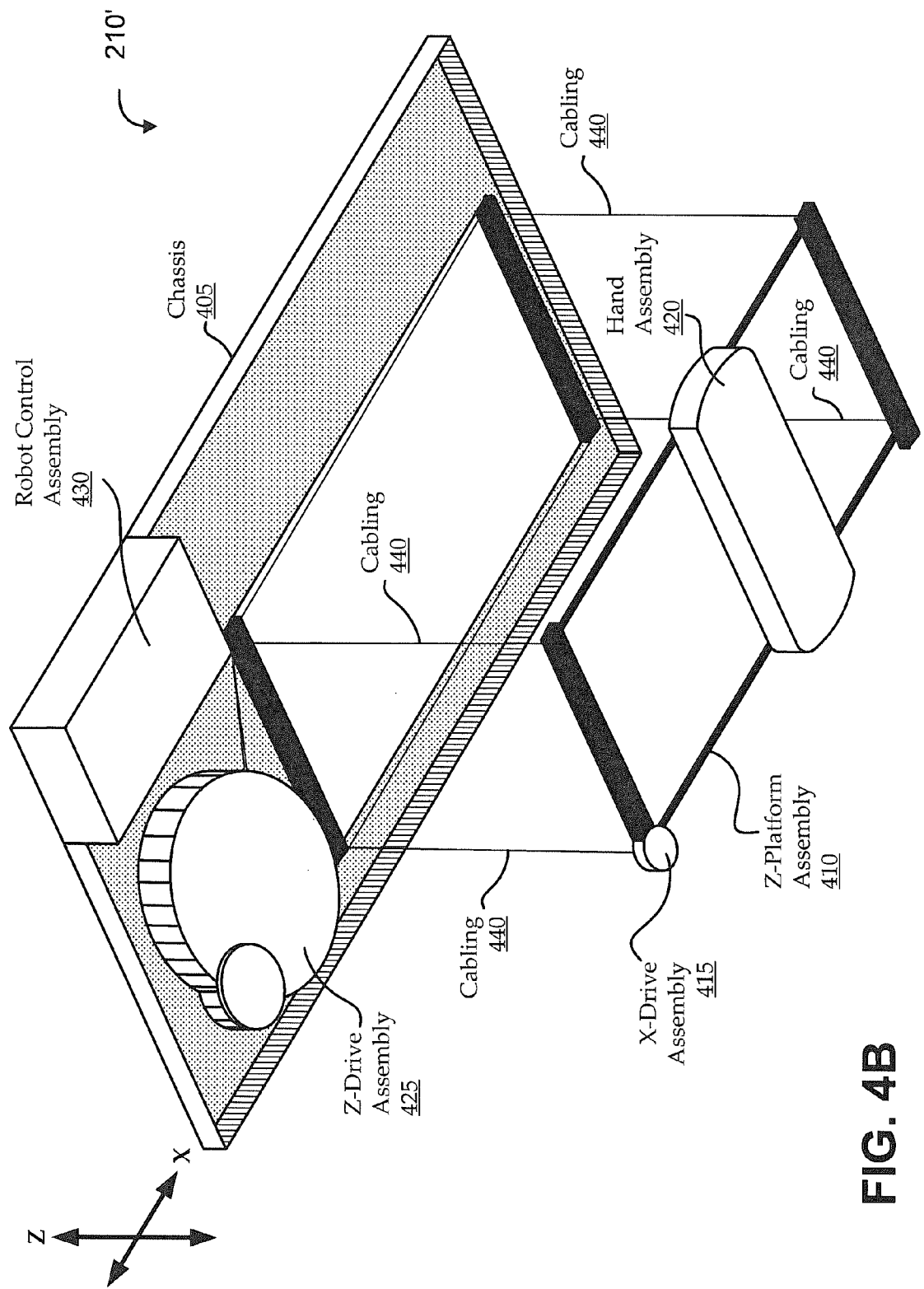
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (as used herein, the +Z direction is up towards the home position in the robot CRU 210, and the −Z direction is down towards the bottom-most magazine slots of the bottom-most expansion module 120') and an "X" direction (as used herein, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

There are many ways to implement a gripper mechanism for a hand assembly 420. Typically, various techniques are used for providing an "engaged" state (i.e., in which the gripper mechanism is gripping, for example to grab a cartridge) and a "disengaged" state (i.e., in which the gripper mechanism is not gripping, for example to release a cartridge). Some implementations of gripper mechanisms include active components (e.g., solenoids, power cables, specialized hardware and software, etc.) for engaging and disengaging the gripper mechanism. These implementations may include complex, expensive, and/or heavy components. Other implementations use other techniques, for example, to reduce cost, weight, and/or complexity. Some such implementations are described in U.S. patent application Ser. No. 13/348,486, filed on Jan. 11, 2012, titled "Ratcheting Gripper for a Storage Library," which is hereby incorporated by reference in its entirety.

For the sake of illustration, a gripper is implemented with a ratcheting mechanism that toggles between an engaged state and a disengaged state with each extend-and-retract cycle. For example, the gripper mechanism begins in a retracted and disengaged state. It then extends and toggles into its engaged state. In order to toggle back into its disengaged state, the gripper mechanism may have to retract in the engaged state then extend once again to toggle into the disengaged state. This type of ratcheting configuration can be useful, for example, for interfacing with media cartridges in magazines. For example, in a first extend-and-retract cycle, the grip mechanism reaches out (i.e., extends) from the hand assembly 420 and grabs a media cartridge (i.e., toggles into its engaged state), then pulls the media cartridge back into the hand assembly 420 (i.e., retracts while maintaining its engaged state). In a second extend-and-retract cycle, the grip mechanism reaches out from the hand assembly 420 (i.e., extends again), thereby pushing the media cartridge into a magazine slot or drive, releases the media cartridge (i.e., toggles into its disengaged state), and retracts that into the hand assembly 420 without the media cartridge (i.e., retracts while maintaining its disengaged state). It will be appreciated that in the first extend-and-retract cycle, after the grip mechanism reaches out from the hand assembly 420 and grabs the media cartridge, there may be no way for the grip mechanism to toggle into its disengaged date without retracting. Accordingly, if the media cartridge cannot be removed from the magazine slot (e.g., the media cartridges stuck), the grip mechanism may be similarly stuck in its extended and engaged state. Of course, many other gripper mechanism designs may manifest similar issues relating to gripper mechanism recovery.

Embodiments include magazines that have novel drop-out features configured to facilitate gripper mechanism recovery. When the gripper mechanism is stuck in the extended and engaged state, the drop-out feature allows the gripper mechanism to effectively disengage from the cartridge without toggling in to the disengaged state. Once clear of the cartridge, the gripper mechanism may be able to recover. For example, the gripper mechanism may retract, extend, and retract to return to a retracted and disengaged state.

The remainder of the description focuses on embodiments of the hand assembly 420, and particularly on novel techniques for gripper mechanism recovery. The systems described herein are intended to provide context and clarity. However, it will be appreciated that embodiments of the inventive gripper mechanism described can be implemented in many other contexts, including in context of other embodiments of hand assemblies 420, other embodiments of storage systems, etc.

Figure 5:
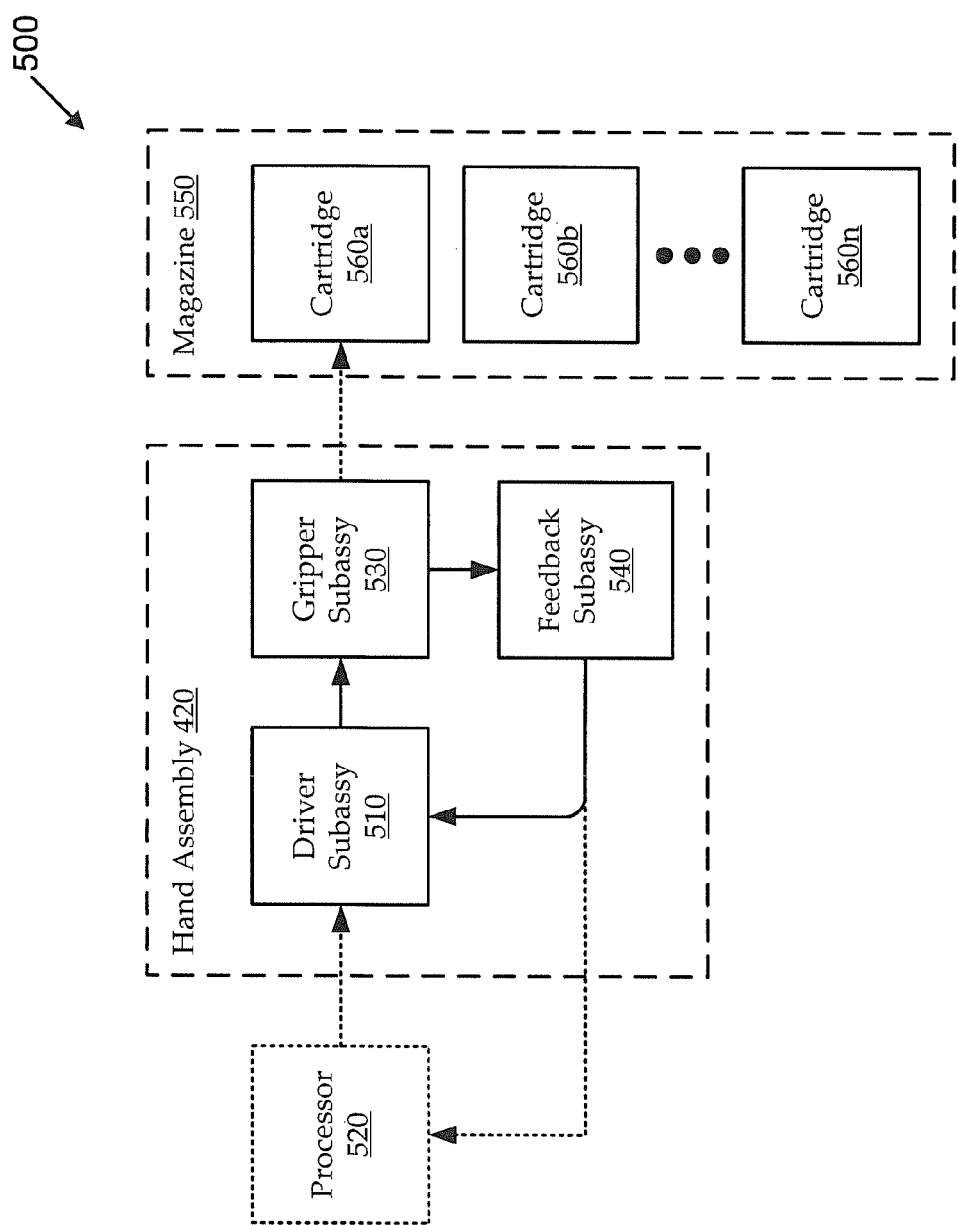
FIG. 5 shows a functional block diagram of an illustrative hand assembly, according to various embodiments.

FIG. 5 shows a functional block diagram 500 of an illustrative hand assembly 420, according to various embodiments. The hand assembly 420 is made up of a number of functional (e.g., mechanical and/or electrical) components, including a driver subassembly 510, a gripper subassembly 530, and a feedback subassembly 540. Functions of the hand assembly 420 may be controlled and/or data to and from the hand assembly 420 may be handled by a processor 520. In some embodiments, the processor 520 is implemented as part of the robot control assembly 430 of the robot CRU 210, for example, as described with reference to FIGS. 4A and 4B. In other embodiments, the processing functionality of the processor 520 is implemented in one or more processors disposed in any useful location (e.g., integrated into the hand assembly 420) in communication with the hand assembly 420.

Embodiments of the driver subassembly 510 drive the mechanical movements of the hand assembly 420. For example, the driver subassembly 510 may include mechanisms for rotating the hand assembly 420 around an axis (e.g., the Z-axis, as discussed above) and/or mechanisms for moving the gripper subassembly 530 in a radial direction with respect to the axis. Embodiments of the gripper subassembly 530 are configured to pick a cartridge 560 from a slot location (e.g., of a magazine 550, or of a drive or other location (not shown)); place a cartridge 560 in a slot location; and/or ferry a cartridge 560 between slot locations around the storage library. As discussed above, embodiments of the gripper subassembly 530 are configured to be in an engaged state and a disengaged state. Some embodiments are also configured to extend and retract from base structure of the hand assembly 420.

In some implementations, the gripper subassembly 530 includes ratcheting and toggling mechanisms. For example, movement of the gripper subassembly 530 in one direction (e.g., in the extend direction) triggers the ratcheting mechanism, which toggles the toggling mechanism; while movement of the gripper subassembly 530 in another direction (e.g., in the retract direction) does not trigger the ratcheting mechanism so as to not toggle the toggling mechanism. In this illustrative configuration, each time the gripper subassembly 530 extends, it toggles between its engaged and disengaged states, and the state is maintained when the gripper subassembly 530 retracts. Toggling to the engaged state may involve partially or completely closing "fingers", extending or retracting "teeth" or "claws," or otherwise engaging a gripping feature configured to interface with a feature of the target object (e.g., the cartridge).

As described above, the gripper subassembly 530 may experience a disengagement error. For example, a stuck cartridge may prevent the gripper subassembly 530 from retracting in its engaged state. This type of error may be detected by the feedback subassembly 540. Various implementations of the feedback subassembly 540 are possible. In some embodiments, the feedback subassembly 540 includes sensors for detecting a pulling force on the gripper subassembly 530 that exceeds a threshold. In other embodiments, the feedback subassembly 540 detects non-completion of the retraction (e.g., after some predetermined amount of time). When the feedback subassembly 540 detects a disengagement error, it may generate a feedback signal. For example, the feedback signal may be any type of analog or digital signal that indicates the error.

In different embodiments, the feedback signal may be sent from the feedback subassembly 542 the driver subassembly 510 and/or to the processor 520. For example, the driver subassembly 510 may be configured to control the movement of components of the hand assembly 420 only according to directions received from the processor 520. Alternatively, the driver subassembly 510 may be configured automatically to respond to feedback from the feedback subassembly 540 without additional direction from the processor 520. In response to receiving feedback indicating the disengagement error, the hand assembly 420 or components thereof (e.g., the gripper subassembly 530) can be directed to drop out of the engagement with the cartridge 560 through the dropout region of the magazine 550.

Illustrative embodiments of hand assemblies 420 and magazines 550 are illustrated in FIGS. 6A-8B. It will be appreciated that the illustrated components are intended as non-limiting examples of components that can provide the novel functionality. Accordingly, many modifications are possible within the scope of inventive embodiments.

Figure 6A:
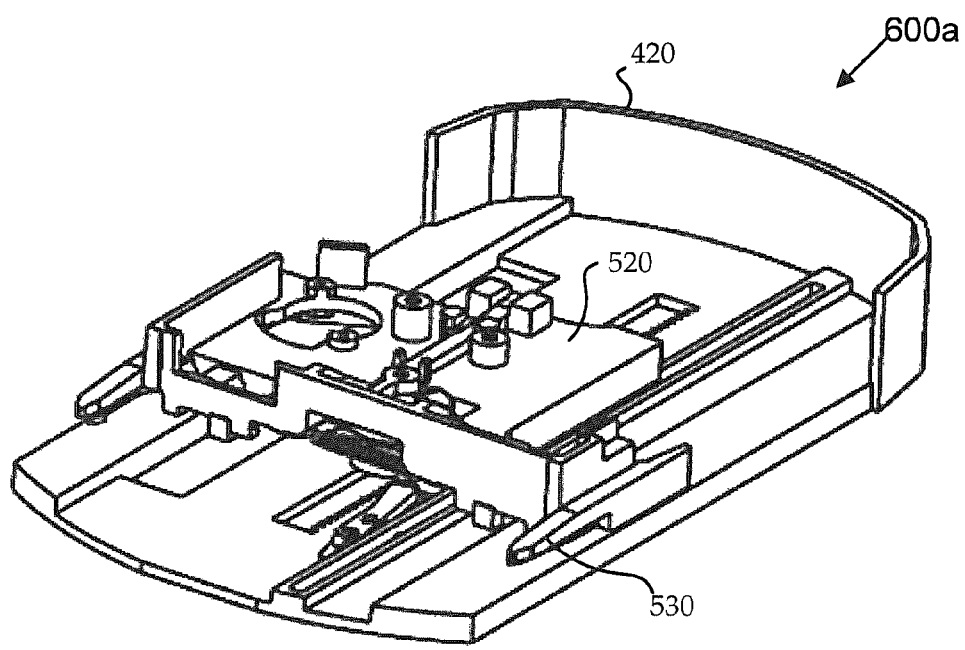
FIGS. 6A and 6B show retracted and extended isometric views, respectively, of an illustrative hand assembly, according to various embodiments.
Figure 6B:
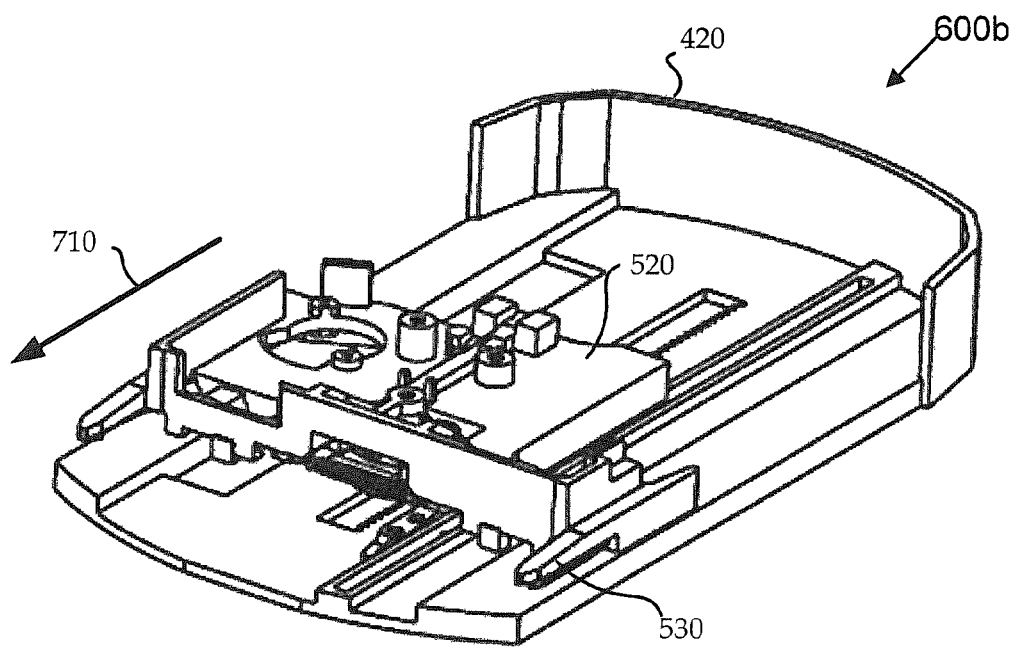

FIGS. 6A and 6B show retracted and extended isometric views 600, respectively, of an illustrative hand assembly 420, according to various embodiments. Each view 600 shows a hand assembly 420 with its gripper subassembly 530. FIG. 6B shows the same hand assembly 420 as in FIG. 6A, after the gripper subassembly 530 has been moved to an extended position in the direction of arrow 610. In the illustrated embodiments, driver components are configured to move the gripper subassembly 530 in a substantially linear path along guide structures of the hand assembly 420. In this way, the gripper subassembly 530 moves from a retracted position in FIG. 7A to an extended position in FIG. 7B. In other embodiments, "extending" the gripper subassembly 530 may involve nonlinear movement, rotation substantially in place around an axis, and/or other types of motion.

As discussed above, embodiments of the hand assembly 420 operate in the context of magazines 550 having novel drop-out functionality. FIGS. 7A and 7B show top views of a partial environment 700 in which a gripper subassembly 530 of a hand assembly 420 engages with an engagement feature 720 of the cartridge 560, according to various embodiments. As illustrated, the cartridge 560 is installed in a slot location 730 of a magazine 550. The magazine 550 includes one or more drop-out features 710. For example, the drop-out features 710 include cutaways, or the like, that are positioned, sized, and/or otherwise configured according to characteristics of the engagement features 720 of the cartridge 560. As illustrated, the engagement feature 720 is a notch in the housing of the cartridge 560, and the dropout feature 710 is a structural cutaway positioned directly above and/or below the engagement feature 720.

According to FIG. 7A, the gripper subassembly 530 is in its retracted and disengaged state. The hand assembly 420 is also shown positioned directly in front of the cartridge 560. According to FIG. 7B, the gripper subassembly 530 is in its extended and engaged state. Fingers of the gripper subassembly 530 are extended (e.g., into the slot location 730 of the magazine 550) and gripping features 740 are in their engaged position. As shown, the gripping features 720 can be teeth, or the like, configured to interface with corresponding engagement features 720 of the cartridge 560.

The gripper subassembly 530 engages with the cartridge 560 by engaging its gripping features 740 (e.g., teeth) with engagement features 720 of the cartridge 560. If the gripper subassembly 530 is not able to disengage from the cartridge 560, or the cartridge 560 cannot be removed from the magazine 550 (e.g., the cartridge 560 is stuck in its slot), it may be desirable to drop the gripper subassembly 530 out of engagement with the cartridge 560. Accordingly, the gripper subassembly 530 can drop away from the engagement feature 720 through the drop-out feature 710 position directly there-below (e.g., or directly there-above). In alternative embodiments, other types of engagement features 720 may be used to engage a cartridge 560, and the drop-out feature 710 can be configured and/or positioned accordingly.

Figure 8:
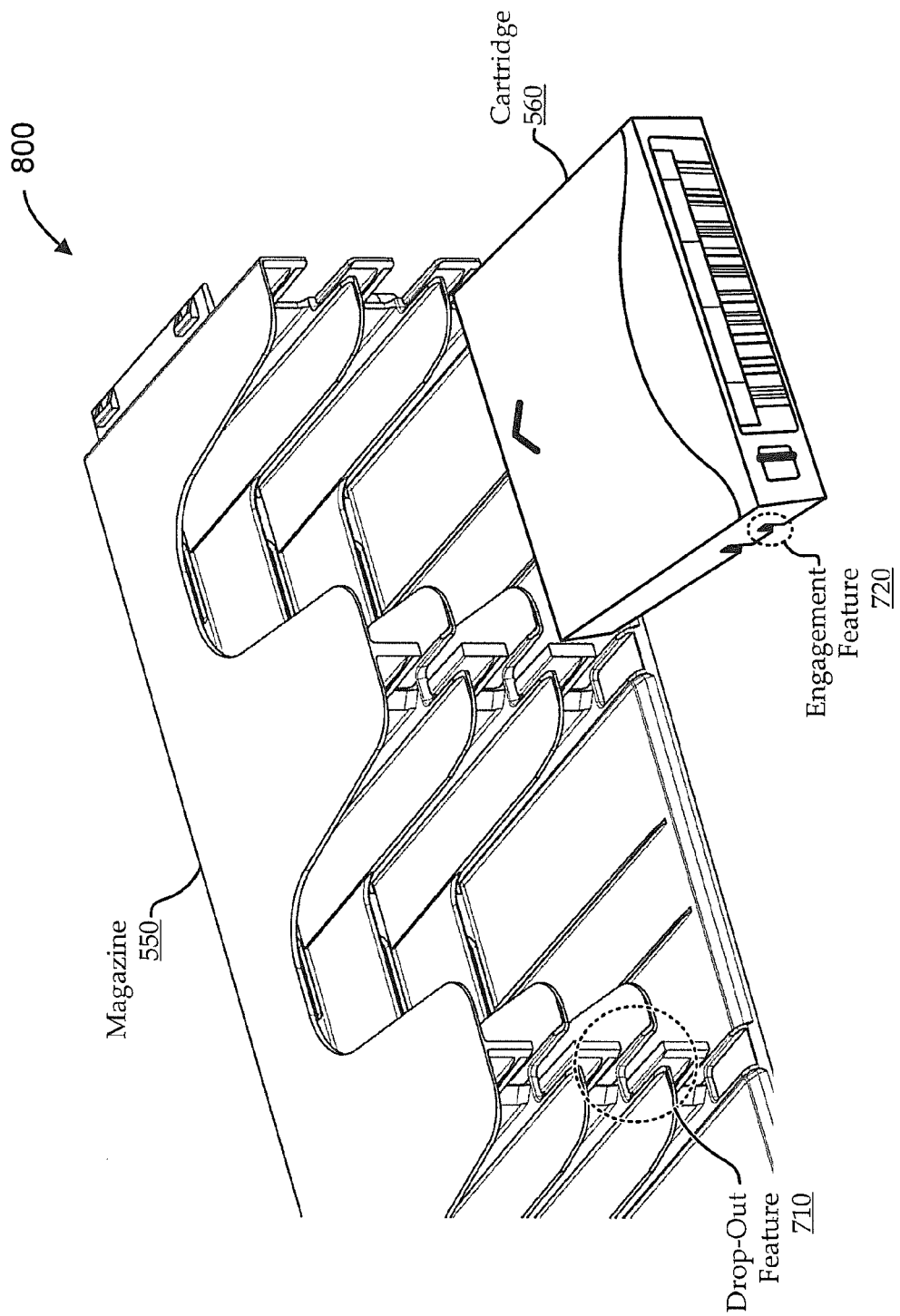
FIG. 8 shows a partial view of an illustrative embodiment of a magazine having drop-out features and an illustrative embodiment of a cartridge having at least one engagement feature, according to various embodiments.

FIG. 8 shows a partial view 800 of an illustrative embodiment of a magazine 550 having drop-out features 710 and an illustrative embodiment of a cartridge 560 having at least one engagement feature 720, according to various embodiments. The magazine 550 includes a number of slot locations configured to receive cartridges, like the illustrative cartridge 560. For example, the slot locations are sized and shaped to receive the standard data storage cartridge. Each slot location may be defined by a number of structural elements, including, for example, walls, bevels, guides, interfaces, etc. The slot locations are also configured to at least partially receive the gripper subassembly 530 in such a way that allows the gripper subassembly 530 to pick and place cartridges with respect to the slot locations.

As illustrated, each slot location has at least one drop-out feature 710. The drop-out feature 710 may include one or more cutaways that are positioned and sized to facilitate drop-out functionality described herein. In particular, the drop-out features 710 are configured in relation to the one or more engagement features 720 of the cartridge 560. For example, the illustrated cartridge 560 has an engagement feature 720 configured as a notch on its housing. The notch may be included in the cartridge 560 housing specifically as an engagement feature 720, or it may be included for some other purpose and is also useful as an engagement feature 720. When the cartridge 560 is installed in a slot location of the magazine 550, it will be appreciated that the engagement feature 720 will be positioned directly above one of the drop-out features 710 of the slot location.

Figure 9:
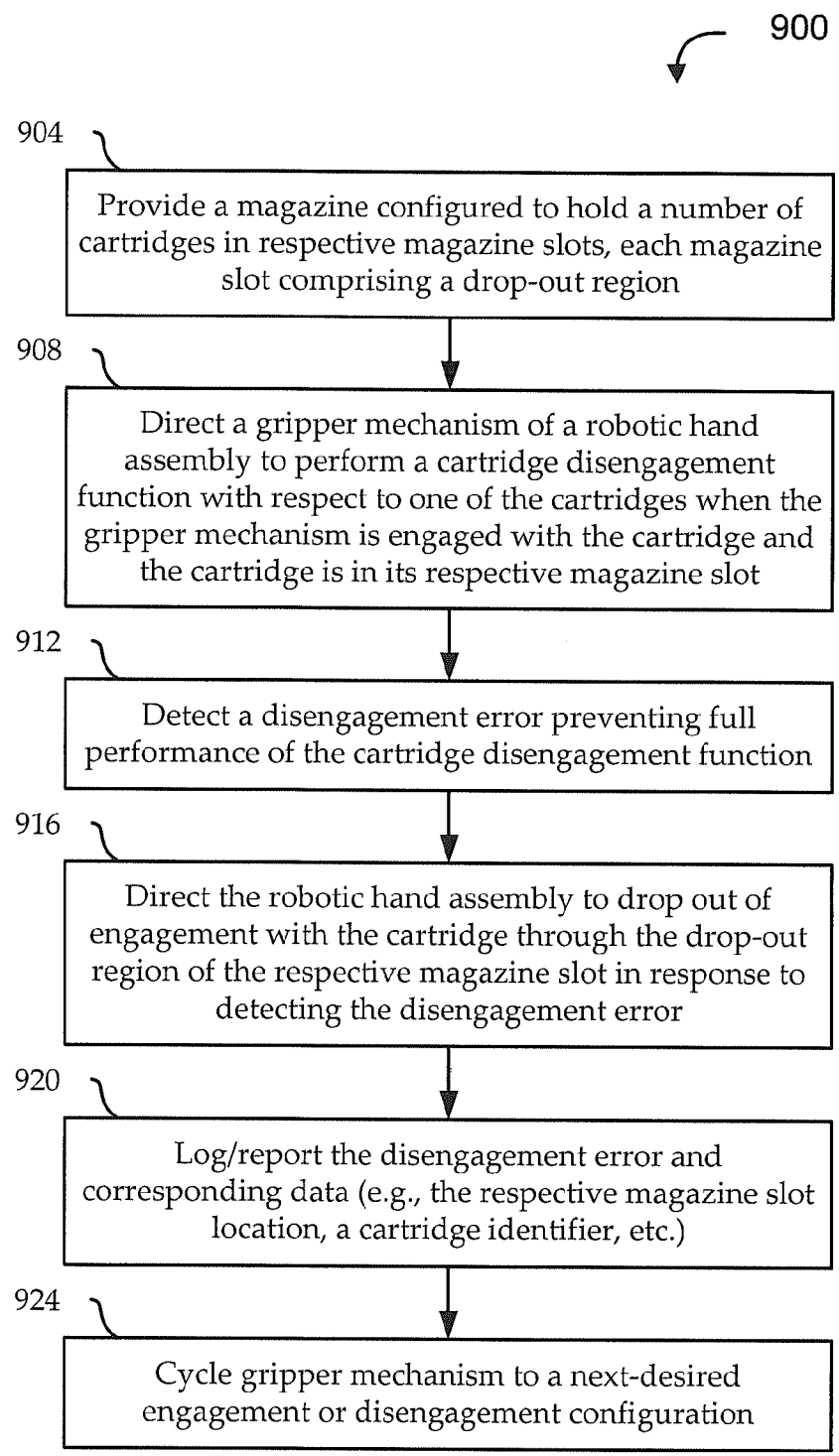
FIG. 9 shows a flow diagram of an illustrative method for implementing drop-out gripper recovery functionality, according to various embodiments.

FIG. 9 shows a flow diagram of an illustrative method 900 for implementing drop-out gripper recovery functionality, according to various embodiments. It is noted that embodiments of the method can be performed using system components other than those discussed above, and the system components described above can be used to perform many functions other than those described with reference to the method embodiments. Accordingly, any references to specific system components in the method descriptions are used to provide added clarity, but are not intended to limit the scope of method embodiments.

Embodiments begin at stage 904 by providing a magazine configured to hold a number of cartridges in respective magazine slots. As described above, each magazine slot includes at least one drop-out region that is configured according to one or more engagement regions of the type of cartridge held in the magazine slots. At stage 908, a gripper mechanism of a robotic hand assembly is directed to perform a cartridge disengagement function with respect to one of the cartridges. For example, prior to stage 908, the robotic hand assembly was positioned proximate to one of the cartridges, its gripper mechanism was extended, and gripping features of the gripper mechanism (e.g., teeth) were toggled to their engaged state. In that state, the gripping features of the gripper mechanism are engaged with engagement features of the cartridge. Accordingly, at stage 908, the gripper mechanism of the robotic hand assembly is being directed to perform a cartridge disengagement function while it is engaged with one of the cartridges and that cartridge is in a respective magazine slot. The cartridge disengagement function may involve using the gripper mechanism to remove the cartridge from its respective magazine slot. The cartridge disengagement function may alternatively involve disengaging the gripping features of the gripper mechanism from the cartridge, thereby leaving the cartridge in its respective magazine slot.

At stage 912, a disengagement error is detected. The disengagement error may indicate that the cartridge disengagement function was not fully performed. For example, the cartridge may be stuck in its respective magazine slot, inhibiting its extraction from its respective magazine slot; the gripping features of the gripper mechanism may be stuck (e.g., on a portion of the cartridge housing), inhibiting their disengagement from the cartridge; etc. As discussed above, it is assumed that the gripper mechanism is implemented in such a way that it effectively cannot be actively disengaged from the cartridge.

At stage 916, in response to detecting the disengagement error, the robotic hand assembly is directed to drop out of engagement with the cartridge through the drop-out region of the respective magazine slot. The robotic hand assembly may drop out by moving the entire robotic hand assembly or by moving only certain portions of the robotic hand assembly, for example, including at least the gripper mechanism. In some configurations, the gripper mechanism is configured to engage with the cartridge in a first plane. For example, the cartridge sits on a bottom surface of the slot location that substantially defines the first plane. Alternatively, the top and/or bottom face of the cartridge substantially defines the first plane. Directing the robotic hand assembly to drop out of engagement with the cartridge may then include directing some or all of the robotic hand assembly to move in a second plane that is orthogonal to the first plane.

In other configurations, the slot locations of the magazine are arranged to form an array at least in an X-direction and to receive cartridges in a Y-direction that is orthogonal to the X-direction. The robotic hand assembly is configured to move in the X-direction and in a Z-direction that is orthogonal to the X-direction and to the Y-direction. Directing the robotic hand assembly to drop out of engagement with the cartridge through the drop-out region involves directing the robotic hand assembly to move at least the gripper mechanism in the Z-direction.

In some embodiments, at stage 920, the disengagement error may be logged and/or reported. For example, the disengagement error may be logged along with corresponding data, such as an identification of the respective magazine slot location, and identification of the cartridge, and identification of the type of disengagement error detected, etc. The error log may be stored for future analysis (e.g., as an error code in a log file for use by a system administrator). The error information may also be displayed to a GUI, or otherwise reported.

Once the gripper mechanism is clear of the cartridge (i.e., after dropping out of engagement with the cartridge in stage 916), the gripper mechanism may be cycled to a next-desired engagement or disengagement configuration at stage 924. For example, in implementations using a ratcheting gripper mechanism, the gripper mechanism may be retracted and extended as needed to place the gripper mechanism in the next-desired engagement or disengagement configuration. In this way, the gripper mechanism may be made ready for its next operation.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A storage system comprising:
   a magazine comprising a plurality of slots, each slot configured to receive cartridges and each slot having a drop-out region;
   a cartridge installed in a respective slot of the magazine; and
   a robotic hand assembly comprising a gripper mechanism configured to engage with the installed cartridge, the robotic hand assembly configured to:
   direct the gripper mechanism to perform a cartridge disengagement function with respect to the installed cartridge while the gripper mechanism is engaged with the installed cartridge;
   detect a disengagement error preventing performance of the cartridge disengagement function; and
   drop at least the gripper mechanism out of engagement with the installed cartridge through the drop-out region of the respective slot of the magazine in response to detecting the disengagement error, thereby disengaging the gripper mechanism from the installed cartridge without removing the installed cartridge from the respective slot.

2. The storage system of claim 1, wherein the robotic hand assembly is configured to direct the gripper mechanism to perform the cartridge disengagement function by retracting the gripper mechanism while maintaining engagement between the gripper mechanism and the installed cartridge to remove the cartridge from its respective slot.

3. The storage system of claim 1, wherein the robotic hand assembly is configured to direct the gripper mechanism to perform the cartridge disengagement function by directing the gripper mechanism to disengage from the installed cartridge while maintaining the installed cartridge in its respective slot.

4. The storage system of claim 3, wherein directing the gripper mechanism to disengage from the installed cartridge while maintaining the installed cartridge in its respective slot comprises directing the gripper mechanism to toggle from an engaged state to a disengaged state.

5. The storage system of claim 1, wherein:
   the gripper mechanism is configured to engage with the installed cartridge in a first plane; and
   the robotic hand assembly is configured to drop at least the gripper mechanism out of engagement with the installed cartridge through the drop-out region by directing the robotic hand assembly to move at least the gripper mechanism in second plane.

6. The storage system of claim 1, wherein:
   the plurality of slots of the magazine are arranged to form an array at least in an X-direction and to receive cartridges in a Y-direction that is orthogonal to the X-direction;
   the robotic hand assembly is configured to move in the X-direction and in a Z-direction that is orthogonal to the X-direction and to the Y-direction; and
   the robotic hand assembly is configured to drop at least the gripper mechanism out of engagement with the installed cartridge through the drop-out region by directing the robotic hand assembly to move at least the gripper mechanism in the Z-direction.

7. The storage system of claim 1, wherein the robotic hand assembly is further configured to:
   cycle the gripper mechanism to a next engagement state after at least the gripper mechanism has dropped out of engagement with the cartridge through the drop-out region of the respective slot of the magazine so that it is clear of the installed cartridge.

8. The storage system of claim 1, further comprising:
   a feedback subsystem in communication with the robotic hand assembly and configured to detect the disengagement error,
   wherein the robotic hand assembly is configured to detect the disengagement error according to feedback received from the feedback subsystem.

9. The storage system of claim 1, further comprising:
   a logging subsystem configured to log the disengagement error along with associated error data in response to detecting the disengagement error.

10. The storage system of claim 9, wherein the error data identifies the respective slot of the magazine and/or the cartridge.

11. The storage system of claim 1, wherein the gripper mechanism comprises at least one gripping feature configured to interface with at least one surface feature of the cartridge.

12. The storage system of claim 1, further comprising:
   at least one drive configured to read data from the cartridges, wherein:
   the storage system is a data storage system;
   the cartridges are data storage cartridges; and
   the robotic hand assembly is configured to ferry the cartridges throughout the data storage system between the plurality of slots of the magazine and the at least one cartridge drive.

13. A method comprising:
   directing a gripper mechanism of a robotic hand assembly to perform a cartridge disengagement function with respect to a cartridge while the gripper mechanism is engaged with the cartridge and the cartridge is installed in a respective one of a plurality of slots of a magazine, each slot comprising a drop-out region;
   detecting a disengagement error preventing performance of the cartridge disengagement function; and
   directing the robotic hand assembly to drop out of engagement with the cartridge through the drop-out region of the respective slot of the magazine in response to detecting the disengagement error, thereby disengaging the gripper mechanism from the installed cartridge without removing the installed cartridge from the respective slot.

14. The method of claim 13, wherein directing the gripper mechanism to perform the cartridge disengagement function comprises directing the gripper mechanism to remove the cartridge from its respective slot by retracting the gripper mechanism while maintaining engagement between the gripper mechanism and the cartridge.

15. The method of claim 13, wherein directing the gripper mechanism to perform the cartridge disengagement function comprises directing the gripper mechanism to disengage from the cartridge while maintaining the cartridge in its respective slot.

16. The method of claim 13, wherein:
   the gripper mechanism is configured to engage with the cartridge in a first plane; and
   directing the robotic hand assembly to drop out of engagement with the cartridge through the drop-out region comprises directing the robotic hand assembly to move in a second plane that is orthogonal to the first plane.

17. The method of claim 13, wherein:
   the plurality of slots of the magazine are arranged to form an array at least in an X-direction and to receive cartridges in a Y-direction that is orthogonal to the X-direction;

the robotic hand assembly is configured to move in the X-direction and in a Z-direction that is orthogonal to the X-direction and to the Y-direction; and directing the robotic hand assembly to drop out of engagement with the cartridge through the drop-out region comprises directing the robotic hand assembly to move at least the gripper mechanism in the Z-direction.

18. The method of claim 13, further comprising:

cycling the gripper mechanism to a next engagement state after the robotic hand assembly has dropped out of engagement with the cartridge through the drop-out region of the respective slot of the magazine and the gripper mechanism is clear of the cartridge.

19. The method of claim 13, further comprising:

providing the magazine having the plurality of slots, each configured to hold a standard data storage cartridge.

20. The method of claim 13, further comprising:

logging and reporting the disengagement error.

\* \* \* \* \*

UNITED STATES PATENT AND TRADEMARK OFFICE
CERTIFICATE OF CORRECTION

| | | |
|---|---|---|
| PATENT NO. | : 9,153,281 B2 | Page 1 of 1 |
| APPLICATION NO. | : 13/466991 | |
| DATED | : October 6, 2015 | |
| INVENTOR(S) | : Hill et al. | |

It is certified that error appears in the above-identified patent and that said Letters Patent is hereby corrected as shown below:

In the specification

Column 5, line 19, delete "and or" and insert -- and/or --, therefor.

Column 6, line 12, delete "and or" and insert -- and/or --, therefor.

Signed and Sealed this
Seventh Day of June, 2016

Michelle K. Lee
*Director of the United States Patent and Trademark Office*